Patented May 2, 1933

1,907,274

UNITED STATES PATENT OFFICE

THOMAS SHERLOCK WHEELER AND WILFRID FRANCIS, OF NORTHWICH, ENGLAND, ASSIGNORS TO IMPERIAL CHEMICAL INDUSTRIES LIMITED, A CORPORATION OF GREAT BRITAIN

PROCESS FOR PRODUCING BENZENE AND CARBON DISULPHIDE

No Drawing. Application filed March 25, 1931, Serial No. 525,330, and in Great Britain March 29, 1930.

This invention relates to the treatment of gaseous hydrocarbons, for example ethane, methane or other members of the paraffin series, unsaturated gaseous hydrocarbons such as ethylene and the like, or mixtures of these.

According to the present invention we pass a gas containing both hydrocarbon and sulphur or a substance capable of supplying sulphur in the gaseous or vapour phase, through a heated reaction zone or chamber, at high temperature and high space velocity, choosing the reaction conditions so as to ensure conversion of as much as possible and preferably substantially all the sulphur content to carbon disulphide, but without seriously affecting the yield of benzene furnished by the process.

The source of the sulphur for the production of carbon disulphide may be sulphur itself, or suitable compounds for example, hydrogen sulphide which interact with hydrocarbons under the working conditions. We do not, however, claim as novel the interaction of hydrocarbon and hydrogen sulphide, to prepare carbon disulphide, per se, nor do we claim the pyrolysis of hydrocarbons to form benzene per se. Our invention consists in the simultaneous production of benzene, and carbon disulphide, which has not, to the best of our knowledge, been hitherto proposed.

For this purpose we preferably employ hydrocarbon gases containing substantial amounts of ethane and/or higher hydrocarbons, and we pass such gases, together with sulphur vapour, hydrogen sulphide or vaporized sulphur compounds, through a heated reaction chamber at a temperature of at least 1000° C. and with a space velocity of at least 50 reciprocal minutes. The space velocity is the number of volumes of gas, calculated at the normal temperature and pressure, passing through unit volume of the reaction chamber in one minute. The reaction chamber should be devoid of packing material so as to present an uninterrupted path to the gases. We emphasize the fact that in carrying out the combined process, we choose conditions which will give the maximum benzene yield and in this connection it should be noted that the conditions which have been stated to be most favourable for carbon disulphide production from hydrocarbons and hydrogen sulphide, that is a 2:1 ratio of $H_2S:CH_4$ or equivalent, and packed reaction chambers, at temperatures of the order of 1000° C. are in the present process inadmissible. In order to obtain good yields both of benzene and carbon disulphide, the inlet gas should not contain more than about 20% of hydrogen sulphide; whi.e the use of packed reaction chambers and excess surface in general beyond that necessary to obtain efficient heat transfer, is avoided. A suitable apparatus for the present invention is a battery of "sandwich" like units, long and deep in proportion to their width, free from packing and almost entirely surrounded by heating flue spaces. Or internal heating may be adopted, such as by an electrically heated resistor.

An important application of this invention lies in the treatment of certain hydrocarbon gases already containing hydrogen sulphide or other suitable sulphur compounds, for example certain types of natural gas. Hitherto it has been the custom to purify such gases from sulphur or to take other steps to render their sulphur content innocuous prior to the use of the gas in a variety of processes. The advantage of carrying out the present process is that such purification is dispensed with, and without seriously affecting the benzene yield we obtain the extra yield of carbon disulphide, while the exit gases are obtained substantially free from sulphur compounds.

Moreover the presence of the hydrogen sulphide and sulphur assists in preventing any tendency to the blockage of the reaction chamber by carbon.

We claim:—

1. Process for the joint production of benzene and carbon disulphide which includes the step of passing a gaseous mixture comprising at least one normally gaseous hydrocarbon and sulphur through an unpacked reaction zone at a temperature of at least 1000° C. and with a space velocity of at least 50 reciprocal minutes.

2. Process for the joint production of benzene and carbon disulphide which includes the step of passing a gaseous mixture comprising at least one normally gaseous hydrocarbon and at least one reactive sulphur compound through an unpacked reaction zone at a temperature of at least 1000° C. with a space velocity of at least 50 reciprocal minutes.

3. Process for the joint production of benzene and carbon disulphide which includes the step of passing a gaseous mixture comprising at least one normally gaseous hydrocarbon and hydrogen sulphide, the proportion of the latter being not more than 20% of the initial gas, through an unpacked reaction zone at a temperature of at least 1000° C. and with a space velocity of at least 50 reciprocal minutes.

4. Process for the joint production of benzene and carbon disulphide which includes the step of passing a crude natural hydrocarbon gas containing sulphur compounds through an unpacked reaction zone at a temperature of at least 1000° C. and with a space velocity of at least 50 reciprocal minutes.

5. Process for the joint production of benzene and carbon disulphide which includes the step of passing crude industrial hydrocarbon gas containing sulphur compounds through an unpacked reaction zone at a temperature of at least 1000° C. and with a space velocity of at least 50 reciprocal minutes.

In testimony whereof we affix our signatures.

THOMAS SHERLOCK WHEELER.
WILFRID FRANCIS.